US012758458B2

(12) United States Patent
Su et al.

(10) Patent No.: US 12,758,458 B2
(45) Date of Patent: Oct. 13, 2026

(54) WALKING AID

(71) Applicant: INNOVATION SPACE TECHNOLOGY CO., LTD., Chiayi County (TW)

(72) Inventors: Wei-Zen Su, Chiayi County (TW); Kuan-Chung Chen, Chiayi County (TW)

(73) Assignee: INNOVATION SPACE TECHNOLOGY CO., LTD., Chiayi County (TW)

( * ) Notice: Subject to any disclaimer, the term of this patent is extended or adjusted under 35 U.S.C. 154(b) by 261 days.

(21) Appl. No.: 18/766,214

(22) Filed: Jul. 8, 2024

(65) Prior Publication Data

US 2025/0041148 A1 Feb. 6, 2025

(30) Foreign Application Priority Data

Jul. 31, 2023 (TW) ................................ 112208023

(51) Int. Cl.
*A61H 3/02* (2006.01)
*A61G 7/10* (2006.01)

(52) U.S. Cl.
CPC ............ *A61H 3/02* (2013.01); *A61G 7/1038* (2013.01); *A61H 2003/0205* (2013.01); *A61H 2201/0107* (2013.01); *A61H 2201/0161* (2013.01); *A61H 2201/1635* (2013.01)

(58) Field of Classification Search
CPC .... A61H 3/00; A61H 3/02; A61H 2003/0205; A61H 2003/001
See application file for complete search history.

(56) References Cited

U.S. PATENT DOCUMENTS

| | | | | | |
|---|---|---|---|---|---|
| 2,811,978 | A * | 11/1957 | Russell | A61H 3/00 | 135/65 |
| 4,106,521 | A * | 8/1978 | Thomas | A45B 7/00 | D3/9 |
| 5,647,602 | A * | 7/1997 | Nevin | A61H 3/04 | 482/68 |
| 5,785,070 | A * | 7/1998 | Block | A45B 9/00 | 135/65 |
| 7,614,414 | B2 * | 11/2009 | Jamshidi | A61H 3/02 | 297/118 |
| 9,936,777 | B1 * | 4/2018 | Parkinson | A45B 9/00 | |
| 11,382,820 | B2 * | 7/2022 | English | A61H 3/00 | |
| 12,011,414 | B2 * | 6/2024 | Rock | A61H 3/04 | |

(Continued)

*Primary Examiner* — Noah Chandler Hawk
(74) *Attorney, Agent, or Firm* — Che-Yang Chen; Law Office of Michael Chen

(57) ABSTRACT

A walking aid includes a first foot stand mechanism and a second foot stand mechanism that are spaced apart and have unequal widths and heights, and a grip rod mechanism and a crossover rod mechanism spanning between the first foot stand mechanism and the second foot stand mechanism. The first foot stand mechanism includes two first foot pole modules spaced apart at front and back, and a first upper rod and a first cross rod spaced apart at top and bottom and spanning between the two first foot pole modules. The second foot stand mechanism includes two second foot pole modules spaced apart at front and back, and a second upper rod and a second cross rod spaced apart at top and bottom and spanning between the two second foot pole modules.

14 Claims, 12 Drawing Sheets

(56) References Cited

U.S. PATENT DOCUMENTS

| | | | | |
|---|---|---|---|---|
| 12,115,123 | B2 * | 10/2024 | Ugoletti | A61H 3/04 |
| 2005/0279392 | A1 * | 12/2005 | Lapierre | A61H 3/02 135/68 |
| 2022/0047445 | A1 * | 2/2022 | Van Varick | A61H 3/04 |
| 2024/0335347 | A1 * | 10/2024 | Dellicour | A61H 3/02 |

* cited by examiner

WALKING AID

BACKGROUND OF THE INVENTION

Field of Invention

The invention relates to a medical assistive device, more particularly to a walking aid.

Related Art

For patients with hemiplegia caused by stroke, they must rely on assistive devices to help them stand up from the edge of the bed or perform walking rehabilitation. Therefore, a support frame is usually set up next to the patient's bed to assist in standing up from the edge of the bed, and a walking aid is placed next to the bed, as a result, many types of assistive devices must be prepared at home. In addition, most of the walking aids currently provided for using by hemiplegic patients are designed as crutches. However, when using this kind of walking aid, because the distances between the four support points are not large, when the crutch-type walker is too close to the side of the body, and if the patient's body center of gravity shifts too much to the side due to the walking pace, the patient will have difficulty relying on the crutch-type walker to support the body, and may easily fall. If the crutch-type walker is supported at a position farther away from the body in order to prevent falls, this support method makes it difficult for the patient to exert force and is not very convenient to use.

SUMMARY OF THE INVENTION

Therefore, an object of the invention to provide a walking aid capable of improving at least one of the drawbacks of the prior art.

The walking aid of the invention comprises a first foot stand mechanism and a second foot stand mechanism spaced apart leftward and rightward, and a grip rod mechanism and a crossover rod mechanism spaced apart at top and bottom and spanning between the first foot stand mechanism and the second foot stand mechanism.

The first foot stand mechanism comprises two first foot pole modules extending from top to bottom and spaced apart at front and back, a first upper rod extending from front to back and spanning between tops of the two first foot pole modules, and a first cross rod spanning between the two first foot pole modules and spaced apart below the first upper rod. The second foot stand mechanism comprises two second foot pole modules extending from top to bottom and spaced apart at front and back, a second upper rod extending from front to back and spanning between tops of the two second foot pole modules, and a second cross rod spanning between the two second foot pole modules and spaced apart below the second upper rod. A distance between the second foot pole modules is less than a distance between the first foot pole modules, and a height of the second upper rod is less than a height of the first upper rod.

The grip rod mechanism is connected to the first upper rod, extends from the first upper rod leftwardly, laterally and outwardly, and extends downwardly and crookedly to connect to the second upper rod. The crossover rod mechanism bridges between the first cross rod and the second cross rod.

Efficacies of the invention are that: through structural designs of the first foot stand mechanism and the second foot stand mechanism with unequal widths and unequal heights, and structural designs of the grip rod mechanism and the crossover rod mechanism spaced apart at top and bottom and spanning between the first foot stand mechanism and the second foot stand mechanism, the walking aid of the invention has multiple uses and is capable of providing more stable support in front, rear, left and right directions.

BRIEF DESCRIPTION OF THE DRA WINGS

Other features and efficacies of the invention will be clearly presented in the implementation modes with reference to the drawings, in which.

DETAILED DESCRIPTION OF THE INVENTION

Before the invention is described in detail, it should be noted that similar components are denoted by same numberings in the following description.

Figure 1:
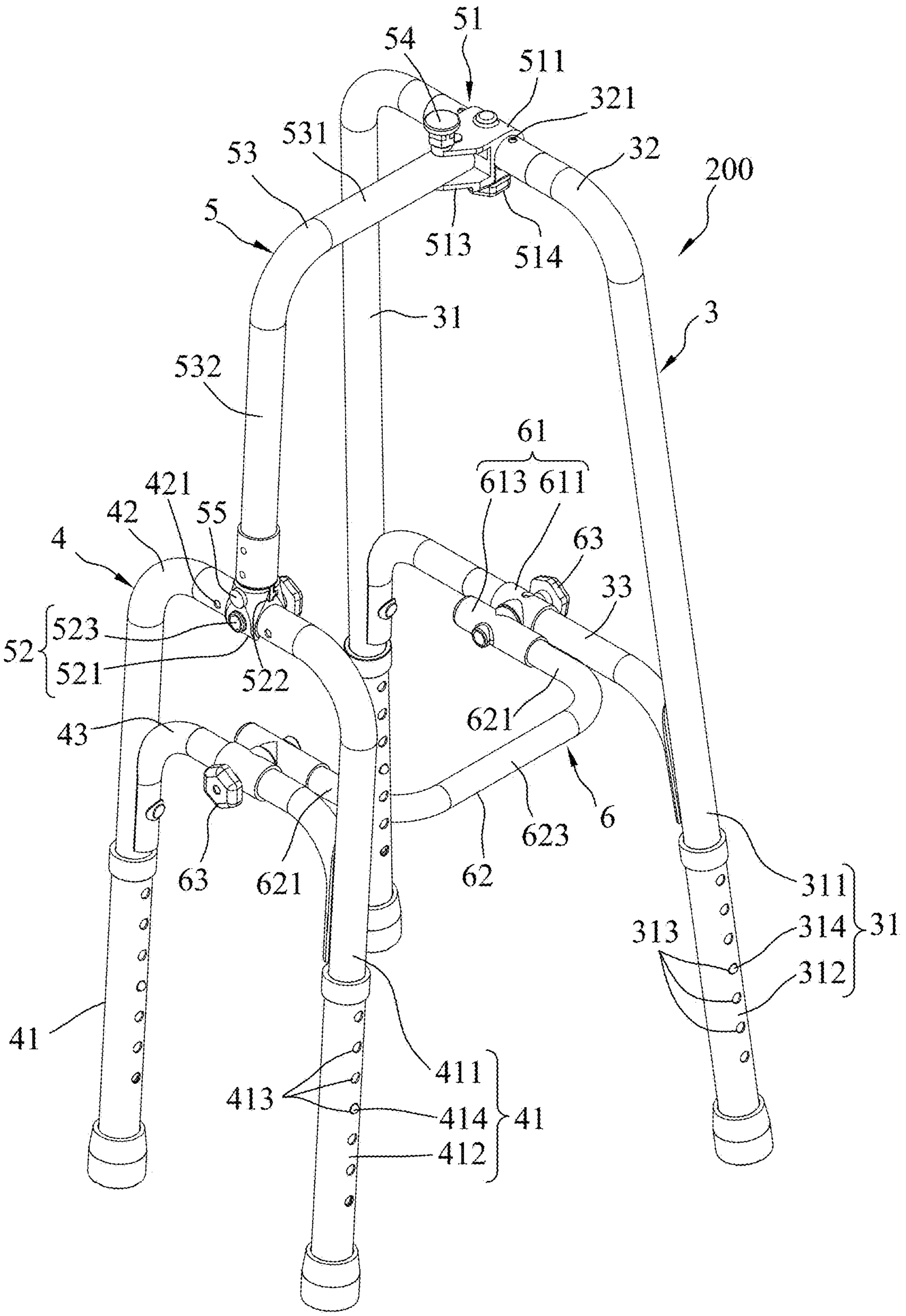
FIG. 1 is a perspective view illustrating structures of a first embodiment of a walking aid of the invention.
Figure 2:
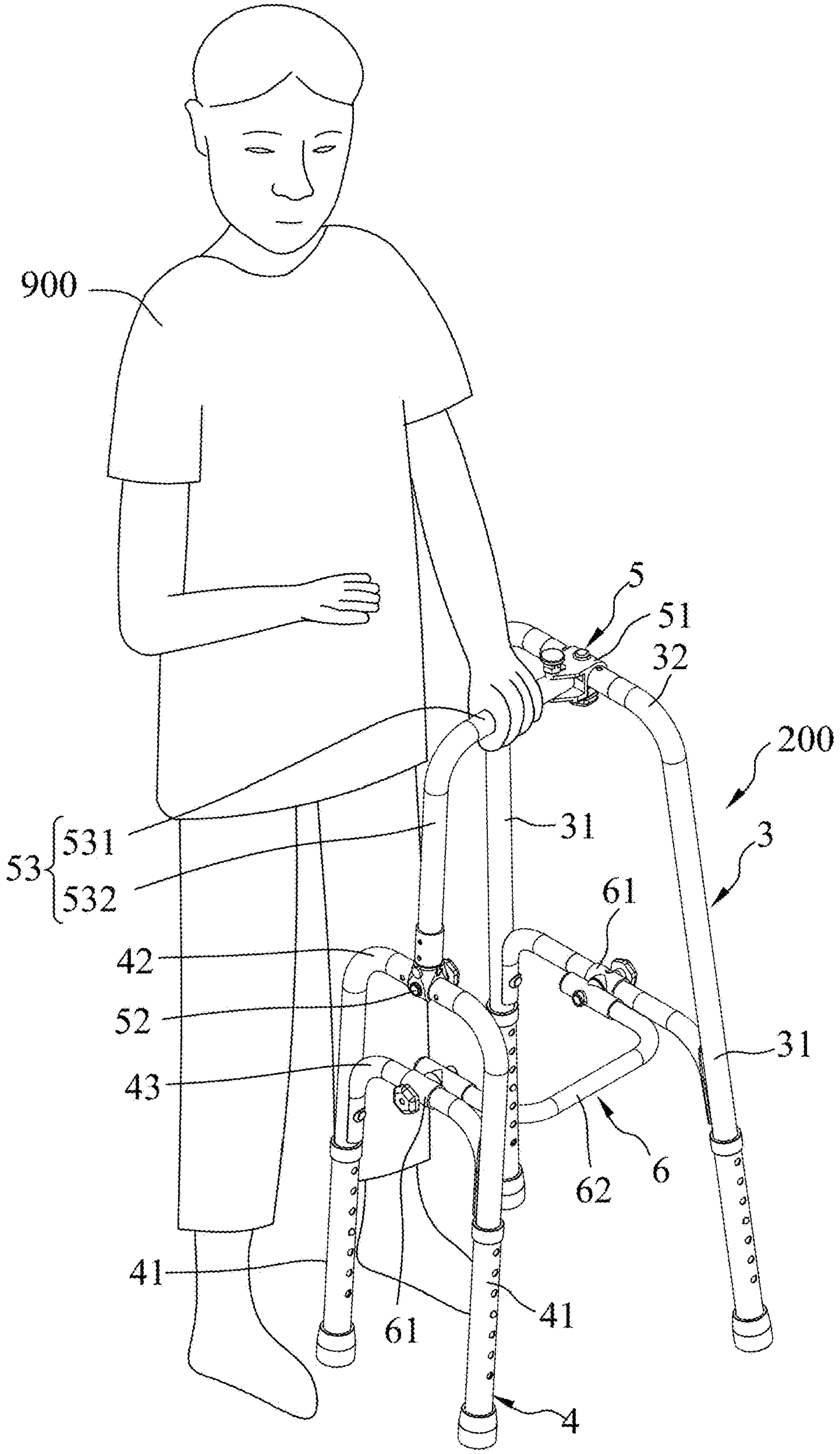
FIG. 2 is a perspective view illustrating a situation when the first embodiment is placed in front of a user and used as a walking assistive device.
Figure 3:
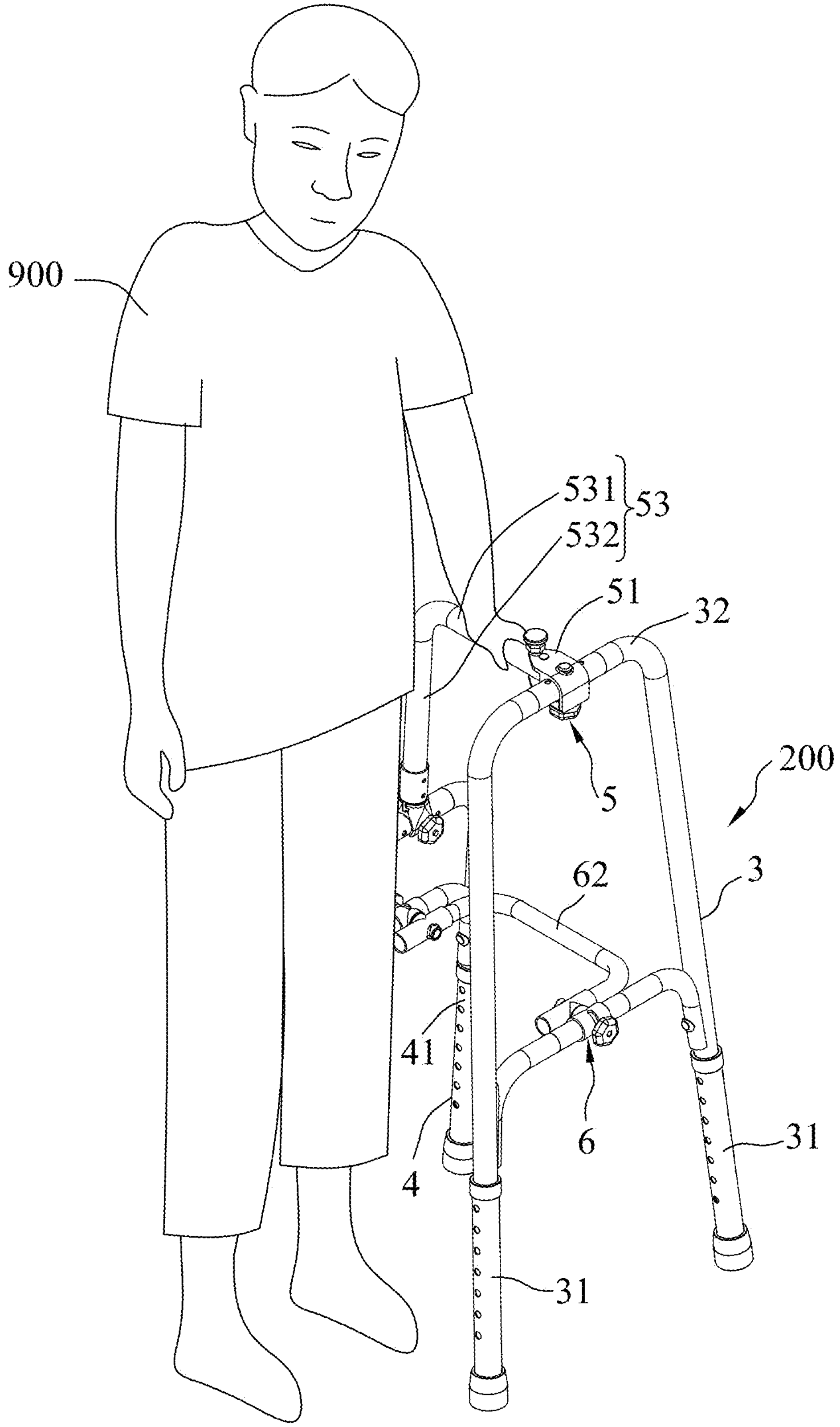
FIG. 3 is a perspective view illustrating a situation when the first embodiment is placed beside the user and used as a crutch.
Figure 4:
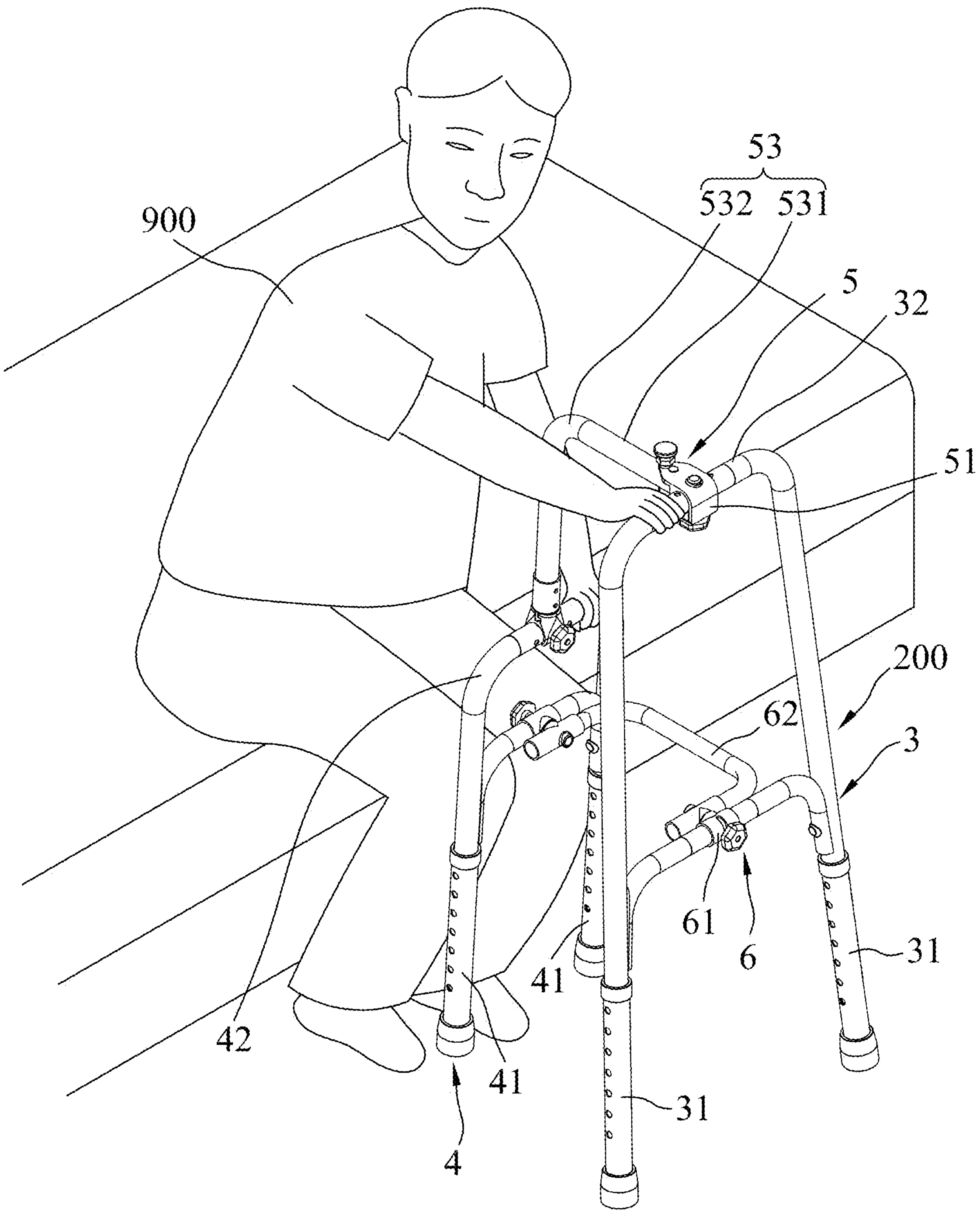
FIG. 4 is a perspective view illustrating a situation when the first embodiment is placed beside a bed and used as an assistive device for standing up.

Please refer to FIGS. 1, 2, 3 and 4, a first embodiment of a walking aid 200 of the invention is suitable for use by a hemiplegic user 900, and can be placed in front of the user 900 and used as a walking assistive device (as shown in FIG. 2), or can be placed beside the user 900 and used as a crutch (as shown in FIG. 3), or can be used as an assistive device when standing up from an edge of a bed (as shown in FIG. 4).

The walking aid 200 comprises a first foot stand mechanism 3 and a second foot stand mechanism 4 that extend from top to bottom and are spaced apart leftward and rightward, a grip rod mechanism 5 extending leftward and rightward and spanning between tops of the first foot stand mechanism 3 and the second foot stand mechanism 4, and a crossover rod mechanism 6 extending leftward and rightward and spanning between the first foot stand mechanism 3 and the second foot stand mechanism 4 and spaced apart below the grip rod mechanism 5. The first foot stand mechanism 3 and the second foot stand mechanism 4 generally face each other leftward and rightward and extend upward and tilt toward each other. In this embodiment, the first foot stand mechanism 3 and the second foot stand mechanism 4 generally face each other leftward and rightward and extend upward and tilt toward each other; however, an implementation mode is not limited thereto, the first foot stand mechanism 3 and the second foot stand mechanism 4 can also be disposed uprightly and parallel to each other.

Please refer to FIGS. 1, 5, and 6, the first foot stand mechanism 3 comprises two first foot pole modules 31 extending from top to bottom and spaced apart at front and back, a first upper rod 32 extending from front to back and spanning between tops of the two first foot pole modules 31, and a first cross rod 33 extending from front to back and spanning between the two first foot pole modules 31 and spaced apart below the first upper rod 32.

Each of the first foot pole modules 31 comprises a first fixed rod 311 extending from top to bottom and connected to the first upper rod 32 with a top end thereof, a first foot pole 312 sleeved with the first fixed rod 311 and used to support on the ground, and a first telescopic positioning member 314. The first foot pole 312 is capable of telescopically shifting upwardly and downwardly relative to the first fixed pole 311, thereby changing an extension length of the entire first foot pole module 31 upwardly and downwardly. The first telescopic positioning member 314 is mounted on either the first fixed rod 311 or the first foot pole 312, and is detachably connected to the other one, so that the first foot pole 312 is capable of telescopically adjusting, shifting and positioning relative to the first fixed rod 311.

The first upper rod 32 is radially penetrated with a plurality of first positioning holes 321 spaced apart at front and back. The first cross rod 33 bridges between bottom ends of the first fixed rods 311 and is located above the first foot poles 312.

In this embodiment, each of the first foot poles 312 has a plurality of telescopic positioning holes 313 that penetrate radially and are spaced apart and distributed at top and bottom along its length. Each of the first telescopic positioning members 314 is a positioning snap that is mounted and fixed in the corresponding first fixed rod 311 and radially penetrates an outer peripheral surface of the first fixed rod 311. The first telescopic positioning member 314 is engaged in one of the telescopic positioning holes 313 of the corresponding first foot pole 312, so that the first foot pole 312 is capable of telescopically adjusting, shifting and positioning relative to the first fixed rod 311. Since there are many types of structures to enable the first foot pole modules 31 to telescopically adjust a length and it is not a focus of improvement of the invention, they will not be described in detail, and implementation is not limited to the above-mentioned implementation mode.

The second foot stand mechanism 4 comprises two second foot pole modules 41 extending from top to bottom and spaced apart at front and back, a second upper rod 42 extending from front to back and spanning between tops of the two second foot pole modules 41, and a second cross rod 43 extending from front to back and spanning between the two second foot pole modules 41 and spaced apart below the second upper rod 42.

Each of the second foot pole modules 41 comprises a second fixed rod 411 extending from top to bottom and connected to the second upper rod 42 with a top end thereof, a second foot pole 412 sleeved with the second fixed rod 411 and used to support on the ground, and a second telescopic positioning member 414. The second foot pole 412 is capable of telescopically shifting upwardly and downwardly relative to the second fixed rod 411, thereby changing an extension length of the entire second foot pole module 41 upwardly and downwardly. The second telescopic positioning member 414 is mounted on either the second fixed rod 411 or the second foot pole 412, and is detachably connected to the other one, so that the second foot pole 412 is capable of telescopically adjusting, shifting and positioning relative to the second fixed rod 411.

The second upper rod 42 is radially penetrated with a plurality of second positioning holes 421 spaced apart at front and back. The second cross rod 43 bridges between bottom ends of the second fixed rods 411 and is located above the second foot poles 412, and the second cross rod 43 is of a same height as the first cross rod 33.

In this embodiment, an extension height of the second foot pole modules 41 upwardly and downwardly is less than an extension height of the first foot pole modules 31 upwardly and downwardly, and a front-to-back distance between the second foot pole modules 41 is less than a front-to-back distance between the first foot pole modules 31, so that a height of the second upper rod 42 is lower than a height of the first upper rod 32, a length of the second upper rod 42 is less than a length of the first upper rod 32, and a length of the second cross rod 43 is less than a length of the first cross rod 33.

In this embodiment, each of the second foot poles 412 has a plurality of telescopic positioning holes 413 spaced apart at top and bottom for engaging the second telescopic positioning member 414. Since structural designs of telescopic adjustment of the second foot pole modules 41 is the same as that of the first foot pole modules 31, details will not be described again.

Figure 5:
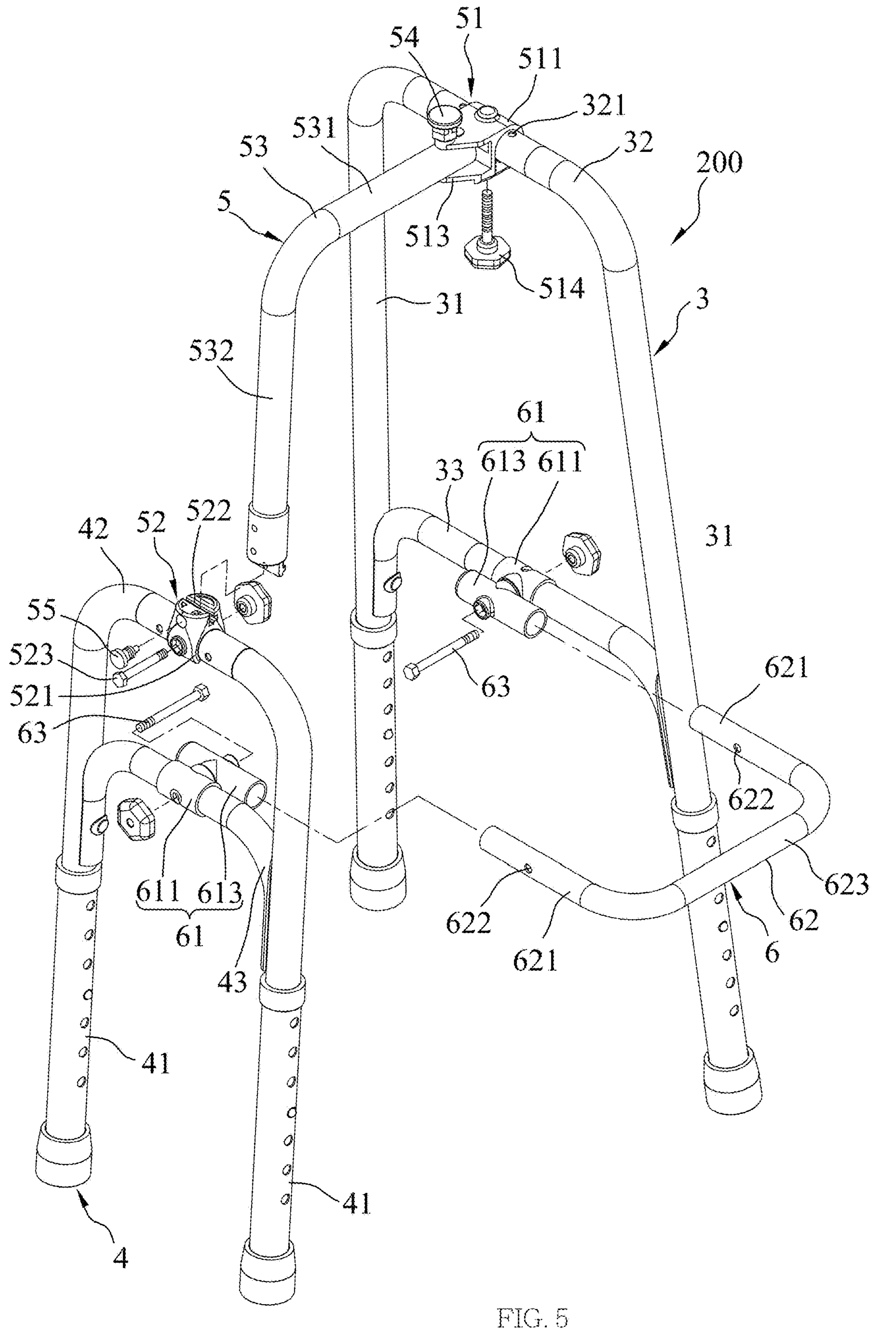
FIG. 5 is an exploded perspective view illustrating structures of the first embodiment.
Figure 6:
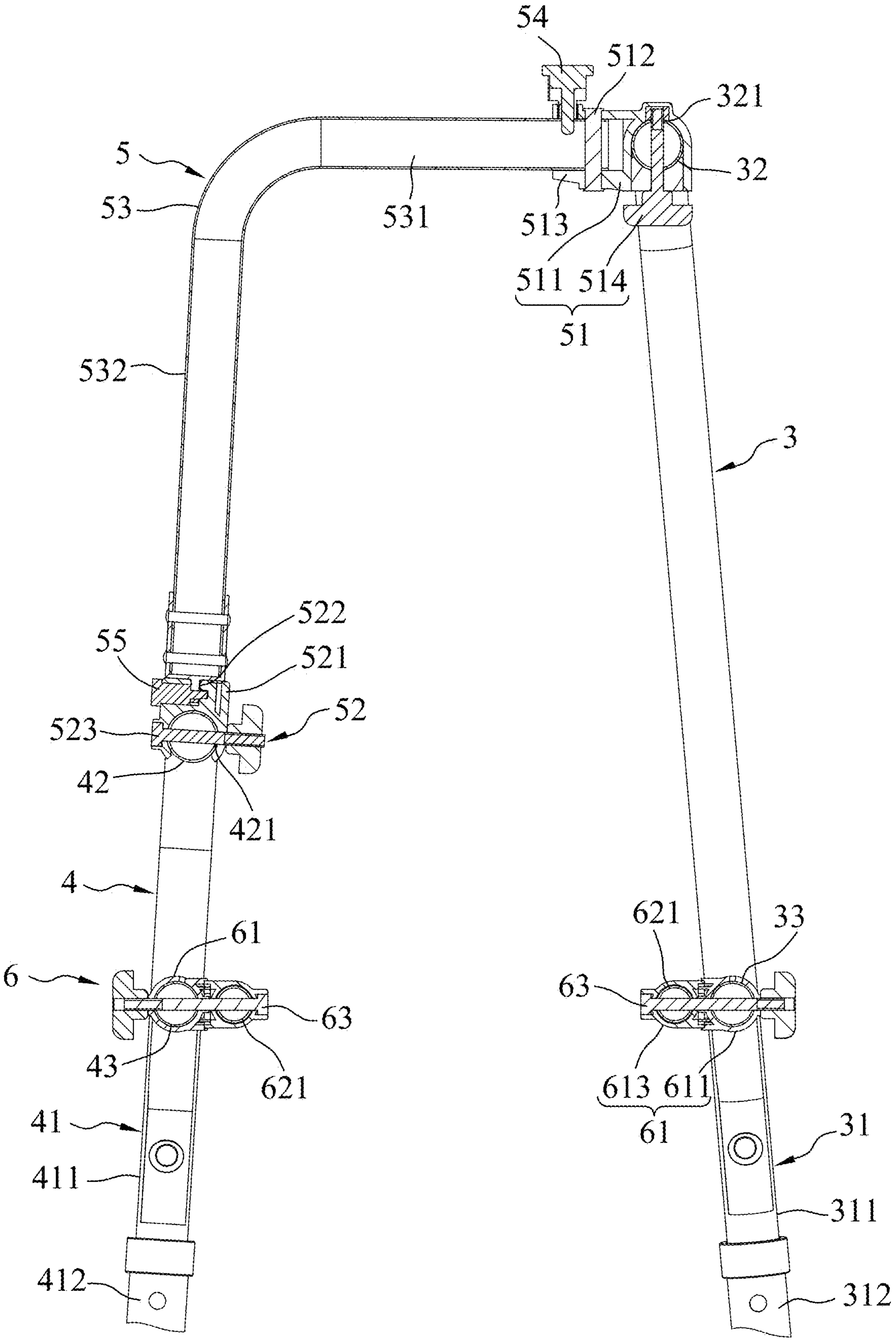
FIG. 6 is an incomplete side cross-sectional view illustrating structures of the first embodiment.
Figure 7:
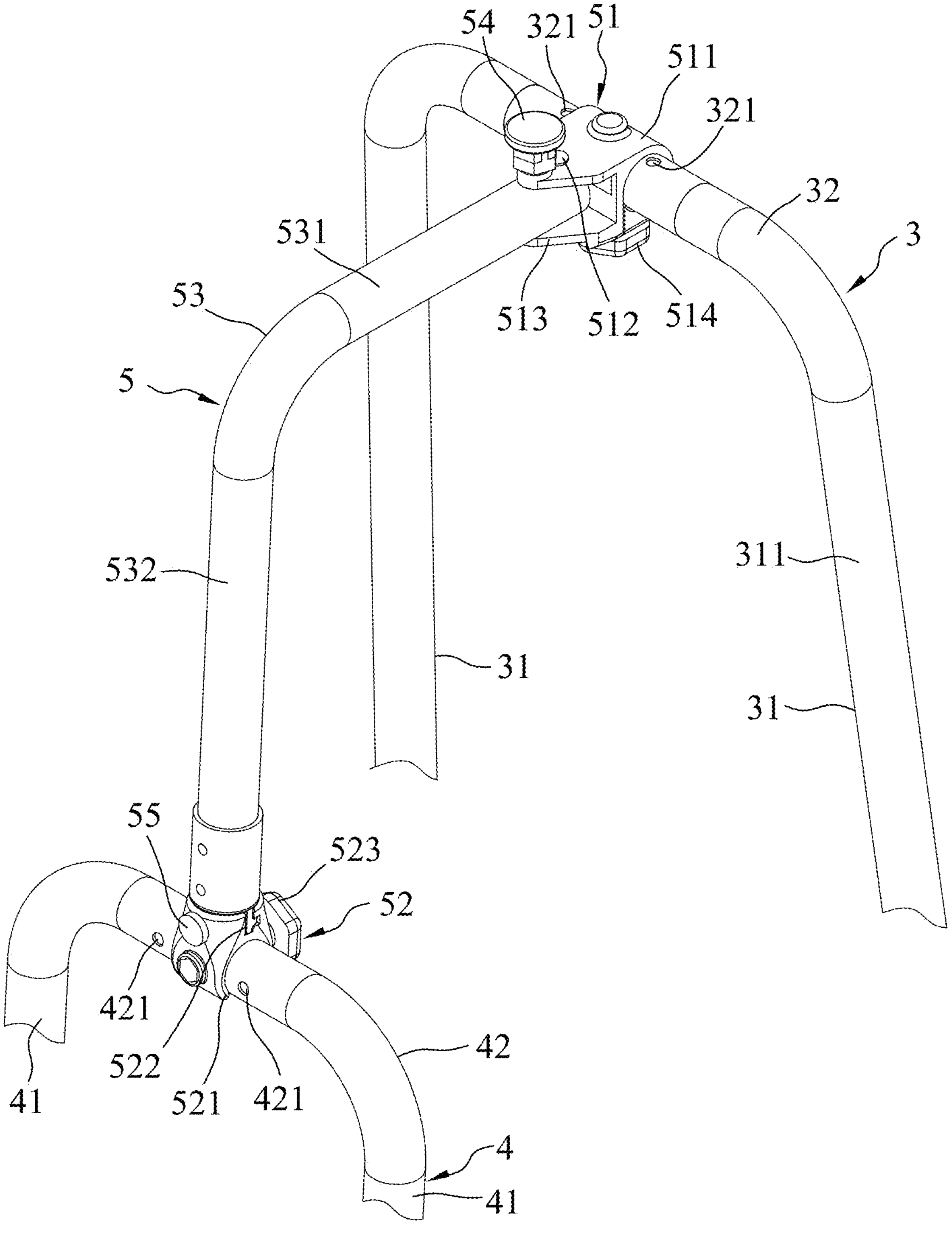
FIG. 7 is an incomplete perspective view illustrating connection structures between a grip rod mechanism and a first foot stand mechanism as well as a second foot stand mechanism in the first embodiment.

Please refer to FIGS. 5, 6, and 7, the grip rod mechanism 5 comprises a first adjustment and shifting module 51 mounted on the first upper rod 32, a second adjustment and shifting module 52 mounted on the second upper rod 42, a grip rod 53 that is bent and extended from top to bottom and mounted between the first adjustment and shifting module 51 and the second adjustment and shifting module 52, and a first locking member 54 and a second locking member 55 respectively mounted on the first adjustment and shifting module 51 and the second adjustment and shifting module 52.

The first adjustment and shifting module 51 comprises a first adjustment and shifting seat 511 capable of sleeving on the first upper rod 32 and shifting forward and backward, and a first positioning pin 514 that is screwed through the first adjustment and shifting seat 511 and inserted into one of the first positioning holes 321 of the first upper rod 32. The first adjustment and shifting seat 511 has a pivot ear portion 513 facing a side of the second foot stand mechanism 4. By inserting the first positioning pin 514 into one of the first positioning holes 321, the first adjustment and shifting seat 511 can be adjusted, shifted and positioned relative to the first upper rod 32.

The second adjustment and shifting module 52 has a second adjustment and shifting seat 521 capable of mounting on the second upper rod 42 and shifting forward and backward, and a second positioning pin 523 that is screwed through the second adjustment and shifting seat 521 and inserted into one of the second positioning holes 421 of the second upper rod 42. By inserting the second positioning pin 523 into one of the second positioning holes 421, the second adjustment and shifting seat 521 can be adjusted, shifted and positioned relative to the second upper rod 42. The second adjustment and shifting seat 521 has an engaging groove 522 with an opening facing upward and penetrating radially forward and backward.

Since structural designs of the first adjustment and shifting module 51 capable of adjusting, shifting and positioning relative to the first upper rod 32, and structural designs of the second adjustment and shifting module 52 capable of adjusting, shifting and positioning relative to the second upper rod 42 are prior art and have many types, they will not be described in detail, and implementation is not limited to the above-mentioned implementation mode.

The grip rod 53 is generally L-shaped and has a grip section 531 pivotally connected to the pivot ear portion 513 via an upright pivot shaft 512 and protruding horizontally toward the second foot stand mechanism 4, and a support section 532 protruding from the grip section 531, with an end thereof extending downwardly and crookedly, and engaging in the engaging groove 522 of the second adjustment and shifting seat 521. Via the pivot shaft 512 the grip rod 53 can be manipulated to change a position pivotally and horizontally between a gripping position bridging the first upper rod 32 and the second upper rod 42 and a folded position swinging away from the second upper rod 42 and leaning against a side of the first foot stand mechanism 3. Changes of swinging pivotally of the grip rod 53 will be described later.

The first locking member 54 can be detachably screwed downward through the pivot ear portion 513 of the first adjustment and shifting seat 511, and can be detachably inserted radially into the grip section 531, so as to non-pivotably fix the grip section 531 to the first adjustment and shifting seat 511. The second locking member 55 can be detachably and transversely screwed through the second adjustment and shifting seat 521, and can be detachably inserted radially into the support section 532, so as to position a bottom end of the support section 532 in the engaging groove 522.

Figure 8:
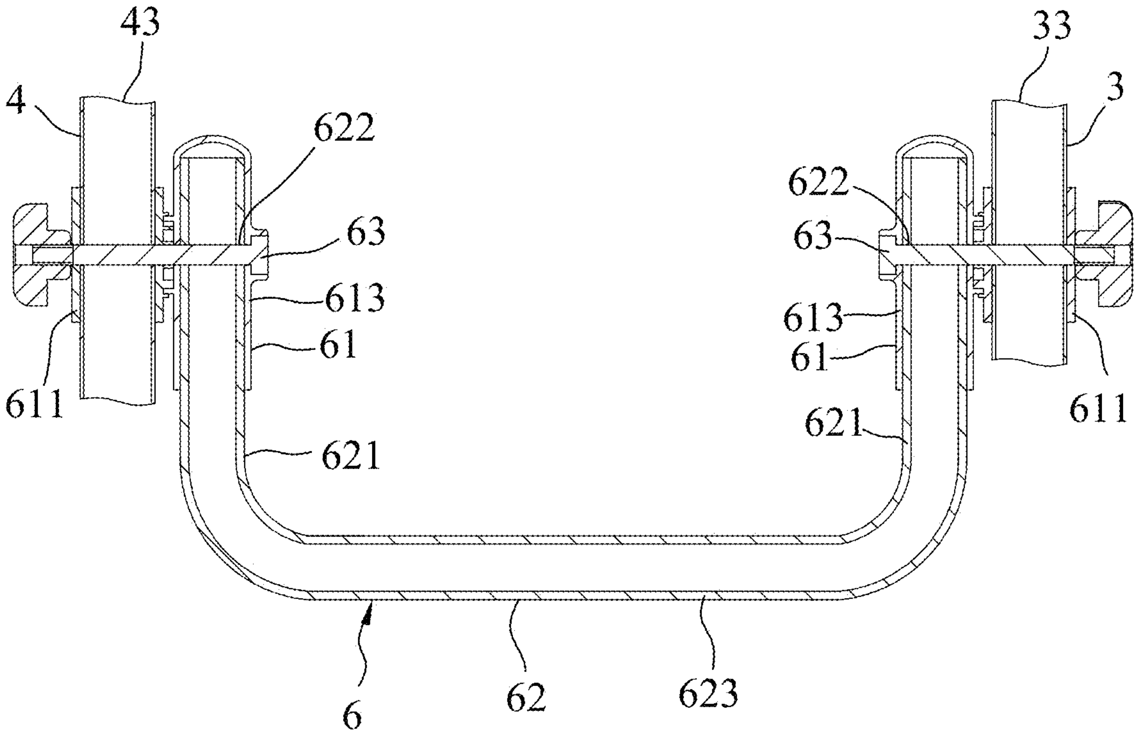
FIG. 8 is an incomplete top cross-sectional view illustrating connection structures between a crossover rod mechanism and the first foot stand mechanism as well as the second foot stand mechanism in the first embodiment.

Please refer to FIGS. 5, 6, and 8, the crossover rod mechanism 6 comprises two mounting seats 61 rotatably sleeved on the first cross rod 33 and the second cross rod 43 respectively, a bridging rod 62 capable of shifting forward and backward and relatively rotatably bridging the mounting seats 61, and two adjustment and positioning members 63 screw-locked and mounted on the mounting seats 61 respectively.

Each of the mounting seats 61 has a first rotating seat tube 611 rotatably sleeved on the first cross rod 33 or the second cross rod 43 correspondingly, and a second rotating seat tube 613 coaxially connected to a side of the first rotating seat tube 611 and adjacent to the other mounting seat 61.

The bridging rod 62 is generally U-shaped with an opening facing backward and has two end portions 621 extending forward and backward and capable of shifting forward and backward and relatively rotatably inserting into the second rotating seat tubes 613 respectively, and a bridging portion 623 connected between the end portions 621. Each of the end portions 621 is radially penetrated with a plurality of third positioning holes 622 spaced apart at front and back. Via the mounting seats 61 the bridging rod 62 is capable of changing a position pivotally between a bridging position supported horizontally leftward and rightward between the first foot stand mechanism 3 and the second foot stand mechanism 4 relative to the first foot stand mechanism 3, and a folded position uprightly leaning against the first foot stand mechanism 3. Changes of swinging pivotally of the bridging rod 62 will be described later.

Each of the adjustment and positioning members 63 penetrates through the corresponding first rotating seat tube 611 by radially screwing through the first rotating seat tube 611 and the second rotating seat tube 613, penetrates through the first cross rod 33 or the second cross rod 43 correspondingly, and is inserted into one of the third positioning holes 622 of the corresponding end portion 621, thereby the corresponding mounting seat 61, the first cross rod 33 or the second cross rod 43 correspondingly, and the bridging rod 62 are locked together.

Please refer to FIGS. 1 and 2, when the first embodiment of the walking aid 200 of the invention is used, if the walking aid 200 needs to be placed in front of the user 900 and used as a walking assistive device, the first foot stand mechanism 3 and the second foot stand mechanism 4 can be adjusted to be spaced apart leftward and rightward, so that the higher first foot stand mechanism 3 is located on a side of the user 900 that can move normally, an opening of the U-shaped bridging rod 62 is adjusted to face the user 900, and the first foot stand mechanism 3 and the second foot stand mechanism 4 are respectively adjusted to locate on left and right sides of a normal lower limb of the user 900, that is, the second foot stand mechanism 4 with a lower height is located between two feet of the user 900. At this time, the user 900 can use a hand with normal function to grasp the grip rod 53 to support an upper body, so that the walking aid 200 can assist in walking.

Please refer to FIGS. 1 and 3, when the walking aid 200 is placed by a side of the user 900 to be used as a crutch, the walking aid 200 can be rotated and adjusted so that the first foot stand mechanism 3 is in front and the second foot stand mechanism 4 is at back. Then, the user 900 can grasp the grip rod 53 at his side with his hand with normal function to support his upper body and use the walking aid 200 as a crutch. When the walking aid 200 is moved forward for a certain distance, and the grip rod 53 is held by the user 900 to step forward, since a spacing between the second foot pole modules 41 on left and right sides of the second foot stand mechanism 4 is smaller, that is, a width of the second foot stand mechanism 4 is narrower, when the user 900 steps forward with the foot adjacent to the walking aid 200, the foot will not hit the second foot stand mechanism 4. Since the first foot stand mechanism 3 and the second foot stand mechanism 4 are roughly distributed on front and rear sides of the body of the user 900, and spans between the first foot pole modules 31 and the second foot pole modules 41 on left and right sides are large, so excellent support stability in front, rear, left and right directions can be provided, and the user 900 can be stably supported.

Please refer to FIGS. 1 and 4, when the walking aid 200 is to be used as an assistive device for standing up from an edge of a bed, the second foot stand mechanism 4 with a lower height can be turned toward the edge of the bed, and the first foot stand mechanism 3 with a higher height is relatively far away from the edge of the bed. Then, the user 900 faces the second foot stand mechanism 4 and grasps the two end portions 621 of the first upper rod 32 with both hands respectively, or grasps the first upper rod 32 and the grip rod 53 with both hands respectively to help support the body forward and upward.

Please refer to FIGS. 1, 5, and 6, when it is required to shift the grip rod 53 forward or backward, the first positioning pin 514 and the second positioning pin 523 can be driven to separate from the first upper rod 32 and the second upper rod 42 respectively, the grip rod 53 can be pushed or pulled forward or backward to drive the first adjustment and shifting seat 511 and the second adjustment and shifting seat 521 to shift forward or backward relative to the first upper rod 32 and the second upper rod 42 respectively. After adjustment and shifting, the first positioning pin 514 is inserted into one of the first positioning holes 321 of the first upper rod 32, and the second positioning pin 523 is inserted into one of the second positioning holes 421 of the second upper rod 42 to complete adjustment and shifting.

When the bridging rod 62 is to be shifted forward or backward, the adjustment and positioning members 63 are screwed and detached from the second rotating seat tubes 613 respectively, that is, detached from the end portions 621 of the bridging rod 62 respectively. Then, push and pull the bridging rod 62 back and forth to shift relative to the second rotating seat tubes 613. After adjustment and shifting, the adjustment and positioning members 63 are screwed through the corresponding third positioning holes 622 of the end portions 621 respectively to complete adjustment and shifting.

Figure 9:
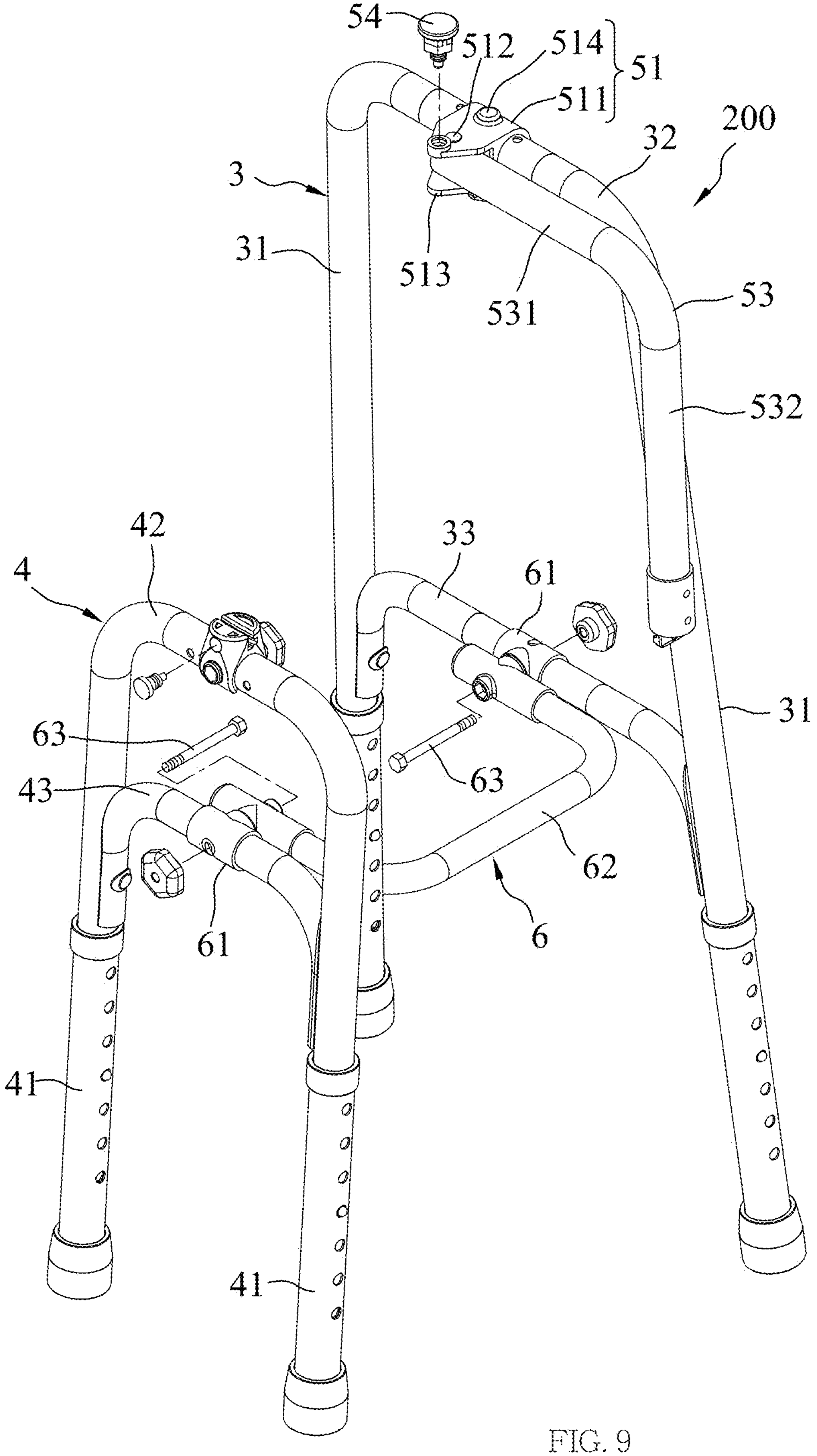
FIG. 9 is a perspective view similar to FIG. 1, illustrating a situation when a grip rod changes to a folded position when the first embodiment is folded.
Figure 10:
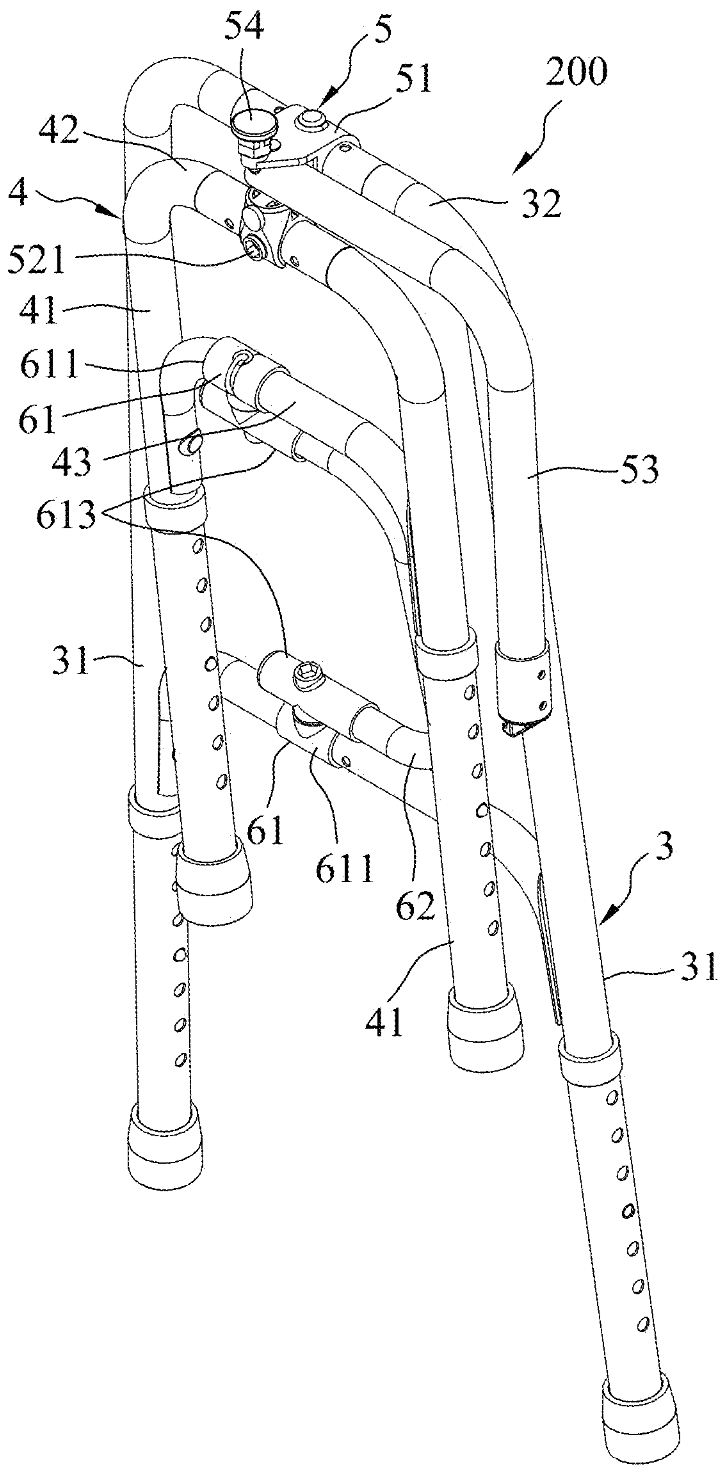
FIG. 10 is a perspective view illustrating a situation when the grip rod changes to the folded position and a crossover rod also changes to a folded position in the first embodiment.

Please refer to FIGS. 1, 9, and 10, when the walking aid 200 is to be folded, the grip rod 53 and the bridging rod 62 are manipulated successively to change to the folded position. When driving the grip rod 53 to change to the folded position, the first locking member 54 and the second locking member 55 are manipulated to separate from the grip section 531 and the support section 532 of the grip rod 53 respectively. Then, push the grip rod 53 forward or backward to drive the support section 532 of the grip rod 53 to separate from the engaging groove 522 of the second adjustment and shifting seat 521 and to swing pivotally and horizontally relative to the first adjustment and shifting seat 511 and to lean against one of the first foot pole modules 31 to limit a position. Then, the first locking member 54 is reset positionally relative to the first adjustment and shifting seat 511, so that the first locking member 54 inserted into the pivot ear portion 513 of the first adjustment and shifting seat 511 is limited positionally to lean against a side of the grip rod 53 facing away from the first foot stand mechanism 3. At this time, the grip rod 53 is positioned in the folded position.

When driving the bridging rod 62 to change to the folded position, the adjustment and positioning members 63 are detached from the mounting seats 61 respectively. Then, the bridging rod 62 is driven to swing upward relative to the first foot stand mechanism 3, so that the corresponding mounting seat 61 in linkage with the bridging rod 62 swings upward pivotally relative to the first cross rod 33 and leans toward the first foot stand mechanism 3, and the second foot stand mechanism 4 is also driven by the corresponding mounting seat 61 to swing upward and lean toward the first foot stand mechanism 3. At this time, the bridging rod 62 is changed to the folded position. After the walking aid 200 is folded, its volume can be greatly reduced, making it convenient for storage.

In this embodiment, each of the end portions 621 of the bridging rod 62 is only provided with the third positioning hole 622. However, in another implementation mode of the invention, each of the end portions 621 can also be provided with the third positioning holes 622 spaced apart at front and back, so that the bridging rod 62 has a function of being adjusted to shift forward and backward.

Figure 11:
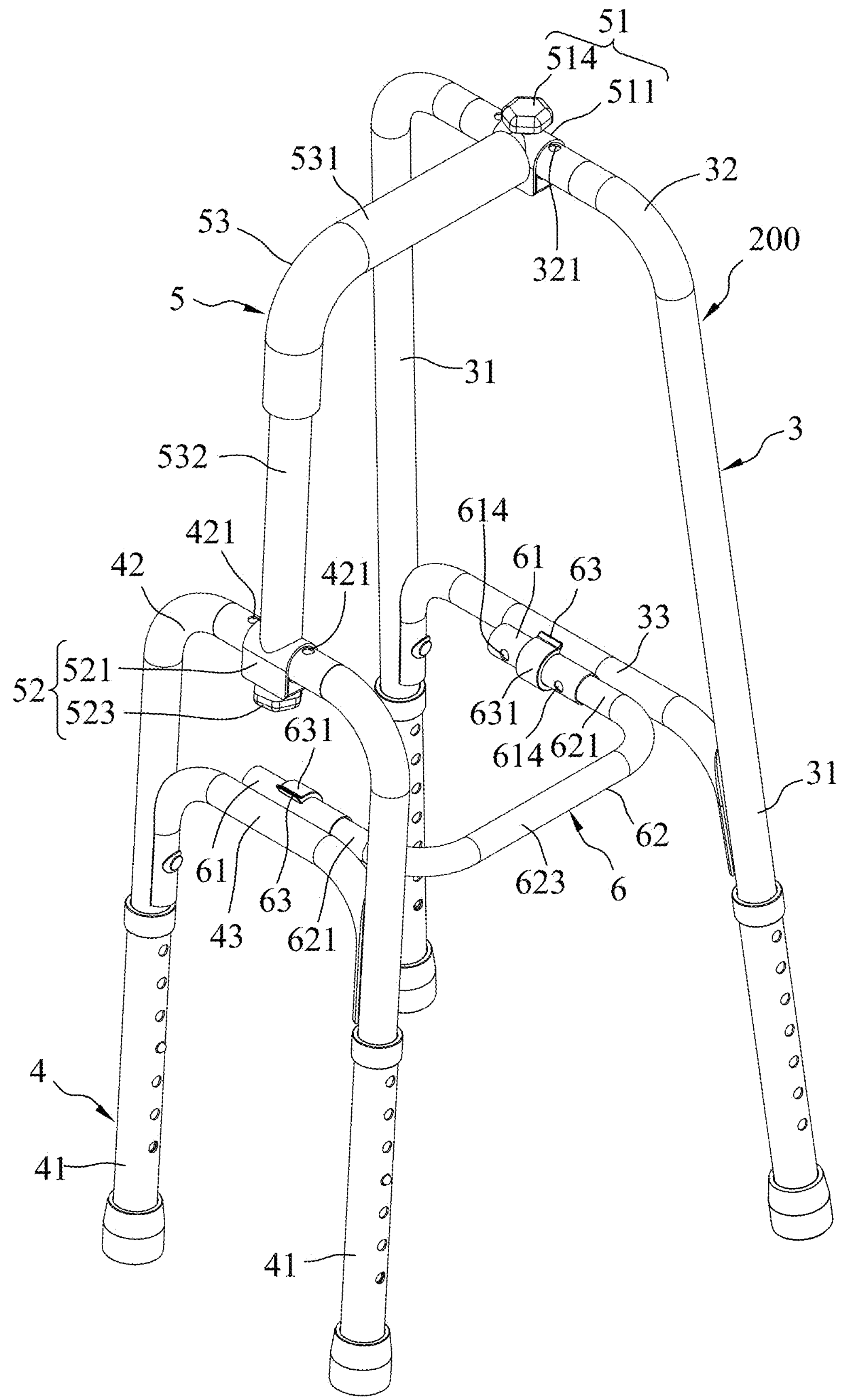
FIG. 11 is a perspective view illustrating structures of a second embodiment of the walking aid of the invention.
Figure 12:
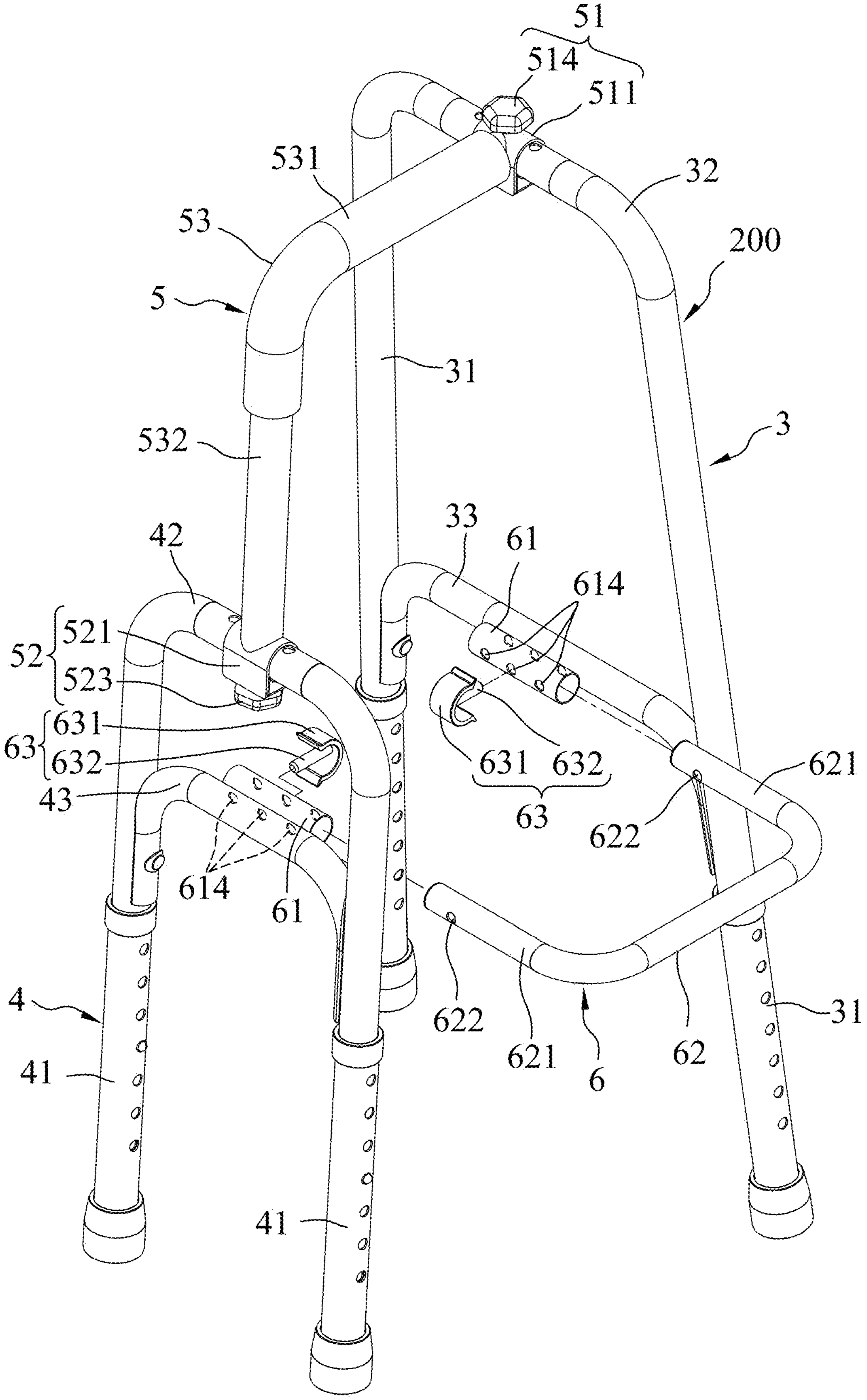
FIG. 12 is an exploded perspective view illustrating structures of the second embodiment.

Please refer to FIGS. 11 and 12, differences between a second embodiment and the first embodiment of the walking aid 200 of the invention lie in structural designs of the grip rod mechanism 5 and the crossover rod mechanism 6. For convenience of explanation, only differences between the embodiments will be described below.

In the second embodiment, the grip rod mechanism 5 and the crossover rod mechanism 6 are non-pivotably folded and mounted between the first foot stand mechanism 3 and the second foot stand mechanism 4.

The grip rod mechanism 5 comprises the first adjustment and shifting module 51 mounted on the first upper rod 32 and capable of adjusting, shifting and positioning forward and backward, the second adjustment and shifting module 52 mounted on the second upper rod 42 and capable of adjusting, shifting and positioning forward and backward, and the L-shaped grip rod 53 spanning and fixed between the first adjustment and shifting module 51 and the second adjustment and shifting module 52.

The crossover rod mechanism 6 comprises the two circular tubular mounting seats 61 respectively mounted and fixed on sides of the first cross rod 33 and the second cross rod 43, the U-shaped bridging rod 62 capable of shifting forward and backward and provided with the two end portions 621 inserted into the mounting seats 61 respectively, and the two adjustment and positioning members 63 respectively radially penetrating the mounting seats 61 and respectively penetrating the end portions 621 detachably. Each of the mounting seats 61 is radially penetrated with a plurality of adjustment and alignment holes 614 spaced apart at front and back. Each of the end portions 621 of the bridging rod 62 is radially penetrated with the third positioning hole 622.

Each of the adjustment and positioning members 63 has a generally C-shaped clip portion 631 with a radial opening, and a latch portion 632 protruding radially and outwardly from an arcuate inner surface of the clip portion 631 and passing through the opening of the clip portion 631. When the adjustment and positioning member 63 is mounted, the latch portion 632 passes through one of the adjustment and alignment holes 614 of the corresponding mounting seat 61 and is inserted into the third positioning hole 622 of the corresponding end portion 621. Then, the clip portion 631 is elastically deformed, clipped and positioned on the mounting seat 61 to complete installation.

Since a manner of adjusting and shifting the grip rod 53 and the bridging rod 62 forward and backward relative to the first foot stand mechanism 3 and the second foot stand mechanism 4 is substantially the same as that in the first embodiment, details will not be described again.

Summing up the above, through structural designs of the first foot stand mechanism 3 and the second foot stand mechanism 4 with unequal widths and unequal heights, and structural designs of the grip rod mechanism 5 and the crossover rod mechanism 6 spaced apart at top and bottom and spanning between the first foot stand mechanism 3 and the second foot stand mechanism 4, the walking aid 200 of the invention has multiple uses. The walking aid 200 can be placed in front of the user 900 and used as a walking assistive device; can be placed beside the user 900 and used as a crutch; and can be placed beside a bed and used as a supporting device for assisting the user 900 to stand up from an edge of the bed. Furthermore, since spans between the first foot pole modules 31 of the first foot stand mechanism 3 and the second foot pole modules 41 of the second foot stand mechanism 4 are large, the walking aid 200 is capable of providing more stable support in front, rear, left and right directions.

In addition, further through structural designs of the grip rod 53 capable of folding and swinging to lean against the first foot stand mechanism 3; structural designs of the bridging rod 62 capable of linking to the second foot stand mechanism 4 and causing the second foot stand mechanism 4 to fold, swing and lean toward the first foot stand mechanism 3; and structural designs of the first foot pole modules 31 and the second foot pole modules 41 capable of telescopically adjusting upwardly and downwardly, a volume of the walking aid 200 can be significantly reduced for achieving convenient transportation and storage. Therefore, the walking aid 200 of the invention is indeed a very innovative, convenient and practical invention, and can indeed achieve the object of the invention.

The above description merely illustrates the preferred embodiments of the invention, and should not be used to limit a scope implemented by the invention, that is, all equivalent changes and modifications made according to the applied scope and the specification of the invention should still fall within the scope covered by the appended claims of the invention.

What is claimed is:

1. A walking aid comprising:

a first foot stand mechanism comprising two first foot pole modules extending from top to bottom and spaced apart at front and back, a first upper rod extending from front to back and spanning between tops of the two first foot pole modules, and a first cross rod spanning between the two first foot pole modules and spaced apart below the first upper rod;

a second foot stand mechanism spaced apart from the first foot stand mechanism leftward and rightward, comprising two second foot pole modules extending from top to bottom and spaced apart at front and back, a second upper rod extending from front to back and spanning between tops of the two second foot pole modules, and a second cross rod spanning between the two second foot pole modules and spaced apart below the second upper rod, a distance between the second foot pole modules being less than a distance between the first foot pole modules, and a height of the second upper rod being less than a height of the first upper rod;

a grip rod mechanism connected to the first upper rod, extending from the first upper rod leftwardly, laterally and outwardly, and extending downwardly and crookedly to connect to the second upper; and a crossover rod mechanism bridged between the first cross rod and the second cross rod.

2. The walking aid as claimed in claim 1, wherein the grip rod mechanism has a first adjustment and shifting module mounted on the first upper rod and capable of adjusting, shifting and positioning forward and backward, a second adjustment and shifting module mounted on the second upper rod and capable of adjusting, shifting and positioning forward and backward, and a grip rod mounted between the first adjustment and shifting module and the second adjustment and shifting module, the grip rod has a grip section extending from the first adjustment and shifting module leftwardly, laterally and outwardly, and a support section extending from the grip section and with an end thereof extending downwardly and crookedly to connect to the second adjustment and shifting module.

3. The walking aid as claimed in claim 2, wherein the first upper rod is penetrated with a plurality of first positioning holes spaced apart at front and back, the second upper rod is penetrated with a plurality of second positioning holes spaced apart at front and back, the first adjustment and shifting module has a first adjustment and shifting seat capable of mounting on the first upper rod in a forward and backward displaceable manner and connecting to the grip section, and a first positioning pin penetrated into the first adjustment and shifting seat and inserted into one of the first positioning holes detachably, the second adjustment and shifting module has a second adjustment and shifting seat capable of mounting on the second upper rod in a forward and backward displaceable manner and connecting to the support section, and a second positioning pin penetrated into the second adjustment and shifting seat and inserted into one of the second positioning holes detachably.

4. The walking aid as claimed in claim 2, wherein the grip section of the grip rod is horizontally and pivotally disposed on the first adjustment and shifting module, the support section is detachably mounted on the second adjustment and shifting module in linkage with pivoting of the grip section, the grip rod mechanism further has a first locking member mounted on the first adjustment and shifting module and locking the grip section non-pivotably, and a second locking member mounted on the second adjustment and shifting module and locking the support section, the crossover rod mechanism comprises two mounting seats respectively mounted and fixed on the first cross rod and the second cross rod, a bridging rod with two end portions thereof relatively rotatably mounted on the mounting seats in front and rear axial directions respectively, and two adjustment and positioning members mounted on the mounting seats respectively and locking the bridging rod non-rotatably, when the first locking member looses the grip section and the second locking member looses the support section, the grip rod is driven to swing away from the second adjustment and shifting module and lean against the first foot stand mechanism and change from a gripping position to a folded position, when the grip rod is in the folded position and the adjustment and positioning members are detached from the mounting seats, via the corresponding mounting seat the bridging rod is driven to pivot upward relative to the first cross rod and lean toward the first foot stand mechanism, and pivot relative to the second cross rod via the corresponding mounting seat, and the linked second foot stand mechanism swings and leans toward a side of the first foot stand mechanism to change from a bridging position to a folded position.

5. The walking aid as claimed in claim 4, wherein the first upper rod is penetrated with a plurality of first positioning holes spaced apart at front and back, the second upper rod is penetrated with a plurality of second positioning holes spaced apart at front and back, the first adjustment and shifting module has a first adjustment and shifting seat capable of mounting on the first upper rod in a forward and backward displaceable manner and connecting to the grip section, and a first positioning pin penetrated into the first adjustment and shifting seat and inserted into one of the first positioning holes detachably, the second adjustment and shifting module has a second adjustment and shifting seat capable of mounting on the second upper rod in a forward and backward displaceable manner and connecting to the support section, and a second positioning pin penetrated into the second adjustment and shifting seat and inserted into one of the second positioning holes detachably, the grip section is pivotally mounted on the first adjustment and shifting seat, the first locking member is mounted on the first adjustment and shifting seat, the support section is embedded in the second adjustment and shifting seat in a horizontal, swingable and detachable manner, and the second locking member is mounted on the second adjustment and shifting seat.

6. The walking aid as claimed in claim 5, wherein the end portions of the bridging rod are capable of shifting forward and backward and relatively rotatably mounting on the mounting seats respectively, each of the end portions is provided with a plurality of third positioning holes spaced apart at front and back, the adjustment and positioning member mounted on each of the mounting seats penetrates through one of the third positioning holes of the corresponding end portion, so that the bridging rod is mounted and positioned and incapable of rotating and shifting.

7. The walking aid as claimed in claim 6, wherein each of the mounting seats has a first rotating seat tube rotatably sleeved on the first cross rod or the second cross rod correspondingly, and a second rotating seat tube coaxially connected to a side of the first rotating seat tube and provided for mounting the bridging rod rotatably and displaceably, each of the adjustment and positioning members penetrates through the corresponding mounting seat by radially penetrating through the first rotating seat tube and the second rotating seat tube, penetrates through the first cross rod or the second cross rod correspondingly, and is inserted into one of the third positioning holes of the bridging rod, when the bridging rod is driven to change from the bridging position to the folded position, the bridging rod drives the mounting seats to rotate relative to the first cross rod or the second cross rod respectively through the first rotating seat tubes.

8. The walking aid as claimed in claim 1, wherein the grip rod mechanism has a first adjustment and shifting module mounted on the first upper rod, a second adjustment and shifting module mounted on the second upper rod, a grip rod connected between the first adjustment and shifting module and the second adjustment and shifting module, a first locking member mounted on the first adjustment and shifting module, and a second locking member mounted on the second adjustment and shifting module, the grip rod has a grip section capable of horizontally and pivotally disposed on the first adjustment and shifting module, and a support section capable of detachably mounting on the second adjustment and shifting module, the grip section extends from the first adjustment and shifting module leftwardly, laterally and outwardly, the support section extends from the grip section and with an end thereof extending downwardly and crookedly, and is capable of detaching from the second adjustment and shifting module in linkage with pivoting of the grip section, the first locking member locks the grip section non-pivotably on the first adjustment and shifting module, the second locking member locks the support section on the second adjustment and shifting module, the crossover rod mechanism comprises two mounting seats respectively mounted and fixed on the first cross rod and the second cross rod, a bridging rod with two end portions thereof relatively rotatably mounted on the mounting seats in front and rear axial directions respectively, and two adjustment and positioning members mounted on the mounting seats respectively and locking the bridging rod non-rotatably, when the first locking member looses the grip section and the second locking member looses the support section, the grip rod is driven to swing away from the second adjustment and shifting module and lean against the first foot stand mechanism and change from a gripping position to a folded position, when the grip rod is in the folded position and the adjustment and positioning members are detached from the mounting seats, via the corresponding mounting seat the bridging rod is driven to pivot upward relative to the first cross rod and lean toward the first foot stand mechanism, and pivot relative to the second cross rod via the corresponding mounting seat, and the linked second foot stand mechanism swings and leans toward a side of the first foot stand mechanism to change from a bridging position to a folded position.

9. The walking aid as claimed in claim 8, wherein the end portions of the bridging rod are capable of shifting forward and backward and relatively rotatably mounting on the mounting seats respectively, each of the end portions is provided with a plurality of third positioning holes spaced apart at front and back, the adjustment and positioning member mounted on each of the mounting seats penetrates through one of the third positioning holes of the corresponding end portion, so that the bridging rod is mounted and positioned and incapable of rotating and shifting.

10. The walking aid as claimed in claim 9, wherein each of the mounting seats has a first rotating seat tube rotatably sleeved on the first cross rod or the second cross rod correspondingly, and a second rotating seat tube coaxially connected to a side of the first rotating seat tube and provided for mounting the bridging rod rotatably and displaceably, each of the adjustment and positioning members penetrates through the corresponding mounting seat by radially penetrating through the first rotating seat tube and the second rotating seat tube, penetrates through the first cross rod or the second cross rod correspondingly, and is inserted into one of the third positioning holes of the bridging rod, when the bridging rod is driven to change from the bridging position to the folded position, the bridging rod drives the mounting seats to rotate relative to the first cross rod or the second cross rod respectively through the first rotating seat tubes.

11. The walking aid as claimed in claim 1, wherein each of the first foot pole modules comprises a first fixed rod extending from top to bottom and connected to the first upper rod with a top end thereof, a first foot pole sleeved with the first fixed rod and used to support on the ground, and a first telescopic positioning member, the first foot pole is capable of telescopically shifting upwardly and downwardly relative to the first fixed pole, the first telescopic positioning member is mounted on either the first fixed rod or the first foot pole, and is detachably connected to the other one, so that the first foot pole is capable of telescopically adjusting, shifting and positioning relative to the first fixed rod.

12. The walking aid as claimed in claim 11, wherein each of the second foot pole modules comprises a second fixed rod extending from top to bottom and connected to the second upper rod with a top end thereof, a second foot pole sleeved with the second fixed rod and used to support on the ground, and a second telescopic positioning member, the second foot pole is capable of telescopically shifting upwardly and downwardly relative to the second fixed rod, the second telescopic positioning member is mounted on either the second fixed rod or the second foot pole, and is detachably connected to the other one, so that the second foot pole is capable of telescopically adjusting, shifting and positioning relative to the second fixed rod.

13. The walking aid as claimed in claim 1, wherein each of the second foot pole modules comprises a second fixed rod extending from top to bottom and connected to the second upper rod with a top end thereof, a second foot pole sleeved with the second fixed rod and used to support on the ground, and a second telescopic positioning member, the second foot pole is capable of telescopically shifting upwardly and downwardly relative to the second fixed rod, the second telescopic positioning member is mounted on either the second fixed rod or the second foot pole, and is detachably connected to the other one, so that the second foot pole is capable of telescopically adjusting, shifting and positioning relative to the second fixed rod.

14. The walking aid as claimed in claim 1, wherein the crossover rod mechanism comprises two mounting seats respectively mounted and fixed on the first cross rod and the second cross rod, a bridging rod mounted between the mounting seats, and two adjustment and positioning members, the bridging rod has two end portions extending forward and backward and capable of respectively mounting on the mounting seats in a forward and backward displaceable manner, and a bridging portion connected between rear ends of the end portions, the adjustment and positioning members are respectively mounted on the mounting seats and detachably connected to the end portions respectively, so that the bridging rod is capable of adjusting, shifting and positioning forward and backward relative to the mounting seats.

* * * * *